M. D. KING.
Tire-Upsetting Machines.
No. 134,384.
Patented Dec. 31, 1872.
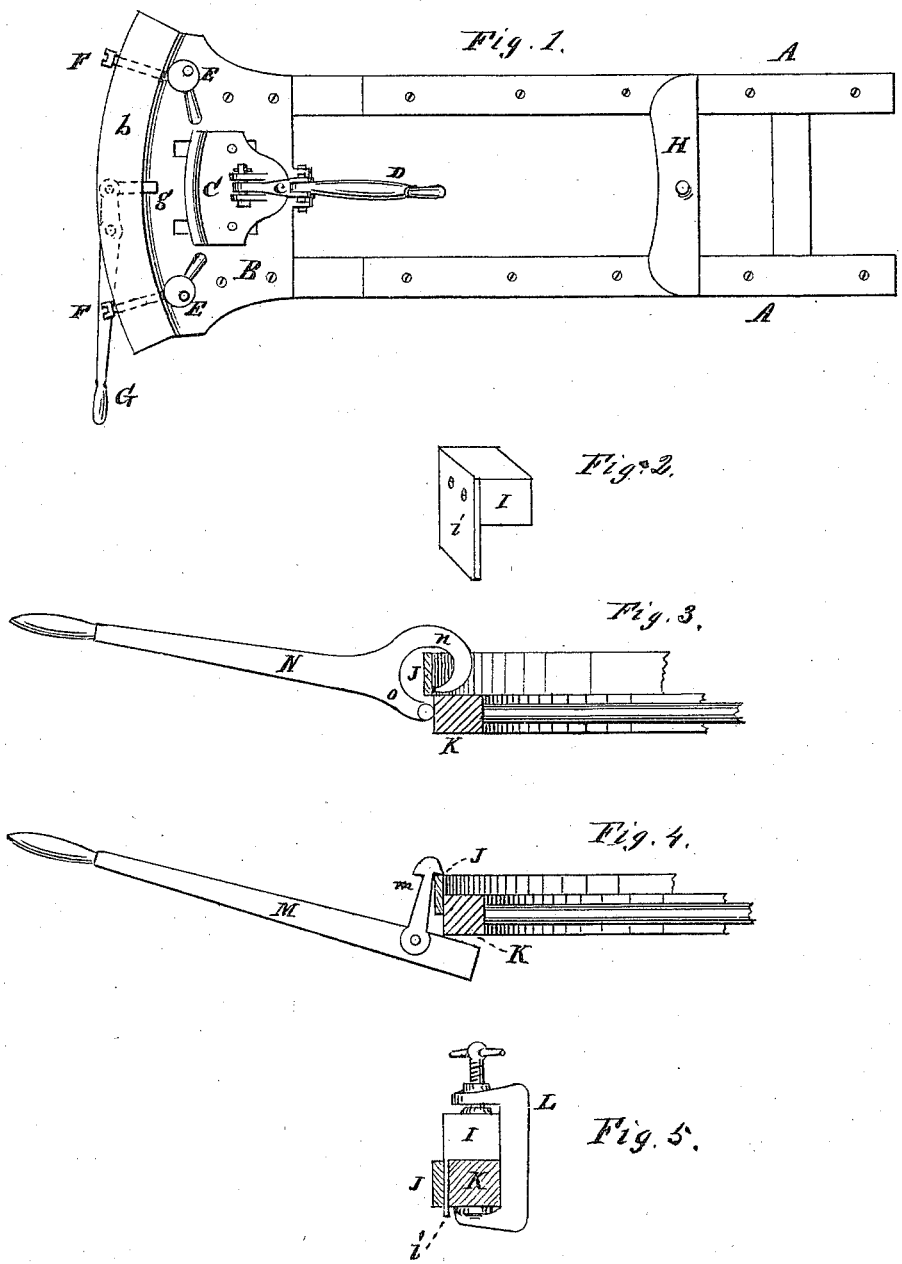
Witnesses:
F. A. Morley
H. E. Durgin
Inventor:
Marquis D. King

UNITED STATES PATENT OFFICE.

MARQUIS D. KING, OF KING'S FERRY, NEW YORK.

IMPROVEMENT IN TIRE-UPSETTING MACHINES.

Specification forming part of Letters Patent No. 134,384, dated December 31, 1872.

*To all whom it may concern:*

Be it known that I, MARQUIS D. KING, of King's Ferry, in the county of Cayuga and State of New York, have invented an Improved Tire Shrinker, Former, and Setter, of which the following is a specification:

This invention relates to a machine or apparatus so constructed that it can be used for the several operations of shrinking tire, forming it, and also setting, the tire being heated for shrinking, but is placed on the wheel when cold, thereby lessening the time and expense, and not burning the paint or finish of the wheel.

Figure 1 is a top view or plan of the machine, and Figs. 2, 3, 4, and 5 are detail views, showing the setting-tools and the manner of using them.

A A is a frame, on which is fastened a head-plate, B. This head-plate has an elevated curved bench or outer edge, b. A metallic block or form, C, is attached to the plate B in such manner as to slide to and from the circular-raised part b by bolts or projections working in slots in the said plate B. This sliding block has a convex form on its outer edge, and is operated by a lever, D, that has a fulcrum on the plate B, and connects with the block C by a link or connecting-rod, c.

For shrinking or upsetting tire, the tire is heated and laid against the concave side of the bench b. By means of a crimping-lever, G g, that part of the tire between the cams E E is forced in against the sliding block C. The tire is then firmly secured by the cams E, and the upsetting done by forcing the crimped portion back against the bench b by the block and lever C D.

For forming tire, the cams E are removed, and the straight bar bent to a circle by passing it between the curved bench b and the block C, the sliding block C being forced up on it as it is fed in intermittently. For varying the size of the circle, set-screws F F are provided; and by screwing them in so that they project on the concave side of the bench b a small form of tire is made.

For setting the tire cold, the wheel is placed on the machine, one of its sides resting against an adjustable tail-block, H, and the felly of the opposite side resting upon the bench b. The tire is then placed on the wheel as far as it will go easily, and one side is held by placing the thin projection i of the block I, Fig. 2, between the tire J and the felly K, as shown in Fig. 5, and the block is secured to the felly by a clamp, L. The other side of the tire is then drawn or sprung over the felly by a hooked lever, N, Fig. 3, and forced down by a lever, M, Fig. 4, and by means of these tools the cold tire is soon forced on the felly around to the block I i, when the said block is withdrawn.

It will be seen that the bar N has a powerful leverage, and while one part, n, draws the tire out, the opposite part o rests upon and depresses the felly.

The lever M has a double-headed hook, m, pivoted to it, and the two hooks are at different distances from the lever; and it is also pivoted to the lever on one side of its center, so that by turning the lever over the hook is lengthened out or shortened, which, with the double head of the hook, makes four different lengths of reach for the said hook m. By use of the block with the projection i between the tire and the felly the tire is placed on the wheel without cutting or skinning the felly. The upper face of the bench b is made concave longitudinally, so that the felly will rest fair and solid throughout.

Having thus described my invention, what I claim, and desire to secure by Letters Patent, is—

The frame A A H, with the head-plate B b, sliding block C D, cams E E, set-screws F F, and crimping-lever G g, all constructed and arranged as and for the purpose herein specified.

The above specification of my invention signed by me this 20th day of June, 1872.

MARQUIS D. KING.

Witnesses:
F. A. MORLEY,
H. E. DURGIN.